(12) United States Patent
Coel et al.

(10) Patent No.: US 8,316,974 B2
(45) Date of Patent: Nov. 27, 2012

(54) ADJUSTABLE RADIATOR GRILL ARRANGEMENT

(75) Inventors: Isa Coel, Frankfurt (DE); Patrick Stuebing, Waechterbach (DE); Thomas Schindler, Hoesbach (DE)

(73) Assignee: Veritas AG, Gelnhausen (DE)

( * ) Notice: Subject to any disclaimer, the term of this patent is extended or adjusted under 35 U.S.C. 154(b) by 0 days.

(21) Appl. No.: 13/156,382

(22) Filed: Jun. 9, 2011

(65) Prior Publication Data

US 2011/0297468 A1  Dec. 8, 2011

Related U.S. Application Data

(63) Continuation of application No. PCT/EP2009/008905, filed on Dec. 12, 2009.

(30) Foreign Application Priority Data

Dec. 22, 2008 (DE) .......... 10 2008 064 513

(51) Int. Cl.
*B60K 11/00* (2006.01)

(52) U.S. Cl. .......... 180/68.1; 165/44; 296/193.1

(58) Field of Classification Search .......... 180/68.1, 180/68.6, 89.1; 296/193.1; 165/44; 293/115
See application file for complete search history.

(56) References Cited

U.S. PATENT DOCUMENTS

| | | | | |
|---|---|---|---|---|
| 139,317 | A * | 5/1873 | Johnson .......... | 301/107 |
| 1,393,917 | A | 10/1921 | Snell | |
| 1,950,792 | A * | 3/1934 | Green .......... | 165/98 |
| 3,084,715 | A * | 4/1963 | Scharres .......... | 137/601.06 |
| 3,115,223 | A * | 12/1963 | Shustrom .......... | 49/2 |
| 3,771,559 | A * | 11/1973 | Alley .......... | 137/601.06 |
| 4,325,283 | A * | 4/1982 | Bemiss .......... | 89/36.07 |
| 4,410,032 | A * | 10/1983 | Mori .......... | 165/44 |
| 4,610,197 | A * | 9/1986 | Van Becelaere .......... | 454/335 |
| 4,753,288 | A * | 6/1988 | Harvey .......... | 165/98 |
| 4,924,826 | A * | 5/1990 | Vinson .......... | 123/195 C |
| 6,296,564 | B1 * | 10/2001 | Arold et al. .......... | 454/156 |
| 6,475,077 | B2 * | 11/2002 | Arold .......... | 454/156 |
| 6,527,333 | B2 * | 3/2003 | Hewitt et al. .......... | 296/180.1 |
| 6,854,544 | B2 * | 2/2005 | Vide .......... | 180/68.6 |
| 7,325,864 | B1 * | 2/2008 | Echeverria .......... | 296/193.1 |
| 7,717,208 | B2 * | 5/2010 | Knauer .......... | 180/68.6 |
| 7,784,576 | B2 * | 8/2010 | Guilfoyle et al. .......... | 180/68.1 |
| 8,161,919 | B2 * | 4/2012 | Klotz et al. .......... | 123/41.04 |
| 2005/0198907 | A1* | 9/2005 | McKnight et al. .......... | 49/475.1 |
| 2010/0071977 | A1* | 3/2010 | Ritz et al. .......... | 180/68.1 |

FOREIGN PATENT DOCUMENTS

| | | |
|---|---|---|
| DE | 32 14 588 A1 | 11/1982 |
| DE | 34 01 021 A1 | 7/1985 |
| DE | 35 33 974 C1 | 9/1987 |
| DE | 39 29 023 C1 | 6/1990 |
| DE | 195 16 942 A1 | 11/1996 |

(Continued)

*Primary Examiner* — John Walters
*Assistant Examiner* — James Triggs
(74) *Attorney, Agent, or Firm* — Harness, Dickey & Pierce, P.L.C.

(57) ABSTRACT

An adjustable radiator grill arrangement for a motor vehicle comprises at least one air channel, through which an air flow for the incident flow of a radiator can be guided. The grill arrangement has a first grill element and a second grill element, which are moveable relative to one another, in order to open or to close the air channel. The first grill element comprises a closing edge, which is disposed at a distance from a counter-edge when the air channel is opened and adjacent to the counteredge when the air channel is closed. The first grill element comprises an elastically deformable closing element, which forms the closing edge.

20 Claims, 9 Drawing Sheets

FOREIGN PATENT DOCUMENTS

| | | |
|---|---|---|
| DE | 196 52 397 A1 | 6/1998 |
| DE | 103 07 632 A1 | 9/2004 |
| DE | 10 2006 021 173 A1 | 11/2007 |
| DE | 10 2006 053 883 A1 | 5/2008 |
| DE | 10 2008 006 020 A1 | 7/2009 |
| EP | 0 163 986 | 11/1985 |

* cited by examiner

ADJUSTABLE RADIATOR GRILL ARRANGEMENT

CROSS-REFERENCE TO RELATED APPLICATIONS

This application is a continuation of international patent application PCT/EP2009/008905, filed on Dec. 12, 2009 designating the U.S., which international patent application has been published in German language and claims priority from German patent application DE 10 2008 064 513.3, filed on Dec. 22, 2008. The entire contents of these priority applications are incorporated herein by reference.

BACKGROUND OF THE INVENTION

The present invention relates to an adjustable radiator grill arrangement for a motor vehicle, comprising at least one air channel, through which an air flow for the incident flow of a radiator can be guided, having a first grill element and a second grill element, which are moveable relative to one another, in order to open or to close the air channel, wherein the first grill element comprises a closing edge, which is disposed at a distance from a counteredge when the air channel is opened and adjacent to the counter-edge when the air channel is closed.

In the wake of tighter provisions relating to exhaust emission standards and climate protection it is necessary to undertake structural measures not only on the engines themselves but also on their immediate surroundings. Thus engine insulation measures are proposed, which considerably reduce the warm-up phase of internal combustion engines. Work is furthermore in progress towards solutions aimed at improving the aerodynamic characteristics of motor vehicles. A further aspect is the reduction of the noise level that results due to a closed engine compartment.

In vehicles, one such major effect can be obtained in the area of the radiator grill. It has thus emerged, for example, that a closed radiator handle can afford considerable improvements in the drag coefficient.

Many such solutions have already been proposed in the past, for example a radiator grill which serves to protect the radiator from stone strike.

It is furthermore known that a closed radiator grill need not adversely affect the cooling efficiency. Only in a few operating states of the vehicle is it necessary to provide the radiator with a direct incident air flow, for example in prolonged traffic congestion or in hill-climbing.

A further problem is the fouling of the radiator grill arrangement and/or of a radiator located behind it due to other contamination, such as insects, for example. This too can lead to blockages and hence to malfunctions of the radiator grill arrangement.

BRIEF SUMMARY OF THE INVENTION

Against this background, the object of the invention is to specify an improved adjustable radiator grill arrangement.

This object is achieved in an adjustable radiator grill arrangement for a motor vehicle, comprising at least one air channel, through which an air flow for the incident flow of a radiator can be guided, having a first grill element and a second grill element, which are moveable relative to one another, in order to open or to close the air channel, wherein the first grill element comprises a closing edge, which is disposed at a distance from a counteredge when the air channel is opened and adjacent to the counter-edge when the air channel is closed, wherein the first grill element comprises an elastically deformable closing element, which forms the closing edge, wherein the closing element comprises a tubular element composed of an elastically deformable material, which encloses a cavity, and wherein a web, which extends in the longitudinal direction of the tubular element, is arranged in the tubular element.

According to another aspect of the invention, there is provided an adjustable radiator grill arrangement for a motor vehicle, comprising at least one air channel, through which an air flow for the incident flow of a radiator can be guided, having a first grill element and a second grill element, which are moveable relative to one another, in order to open or to close the air channel, wherein the first grill element comprises a closing edge, which is disposed at a distance from a counteredge when the air channel is opened and adjacent to the counteredge when the air channel is closed, wherein the first grill element comprises an elastically deformable closing element, which forms the closing edge.

The use of an elastically deformable closing element, composed of an elastically deformable plastic material, for example, can serve to reduce significantly the susceptibility to fouling and snow covering. Firstly, freezing solid to the counteredge can be prevented or at least alleviated by the elastically deformable closing edge. Secondly, since the grill elements move towards one another, the elastic action of the closing element can be used to break up encrusted structures (snow or encrusted insect fouling). Finally the elastically deformable closing edge allows the air channel to be largely closed, even when deposits are present on the closing edge or the counteredge (which again may be caused by foreign bodies).

Here the closing element may be an elastically deformable strip, which is inserted into a rigid grill element. Furthermore, the grill element itself may be an elastically deformable closing element.

It is particularly advantageous if the closing element comprises a tubular element composed of an elastically deformable material, which encloses a cavity.

In this embodiment an especially large elastic deformability can be established, so that the advantages described above can be achieved in an especially pronounced form. Such a tubular element is furthermore inexpensive to produce. In this case the tubular element may have either closed or open connections at the ends.

The tubular element is preferably fixed to a rigid grill element.

It is especially preferred here if the tubular element is designed to vary its volume at least between an opening volume for opening of the air channel and a closing volume for closing of the air channel.

In this embodiment the relative movement between the grill elements can be established by varying the volume of the tubular element.

The variation in the volume can be established either actively by a pump or the like. Here the volume is preferably filled with a fluid such as a gas (for example air) or also a liquid. Alternatively the volume may also be varied as a function of the prevailing air pressure, for example in that the volume is varied by the pressure of the headwind.

It is especially preferred here if the tubular element forms the first grill element and the movement relative to the second grill element is established by the variation in the volume of the tubular element.

Here the tubular element may preferably be fixed to the second grill element or to a carrier element and can be designed to close an aperture in the second grill element or on the carrier element, when the closing volume is established.

In this embodiment the radiator grill arrangement can be established using a very small number of components.

Alternatively the tubular element may also be fixed to a carrier element, which is located adjacently to the second grill element, the tubular element being designed to close an aperture in the second grill element, when the closing volume is established.

In this embodiment the structure of the individual elements used for the radiator grill arrangement may be simple enough to allow an inexpensive design.

It is furthermore advantageous overall if the closing element is fixed to one of the grill elements and is designed to close an aperture in the other grill element, when the grill elements are moved into a closing position relative to one another.

It is furthermore preferred, where a grill element is formed by a tubular element, if its opening volume or its closing volume is established by reducing the cavity of the tubular element through the application of a vacuum.

The space occupied by the tubular element in this state can thereby be significantly reduced.

The vacuum is preferably used for establishing the open volume. Here a fundamental elasticity of the tubular element can be used to establish the closing volume, so that the closed state is established without influencing the volume of the cavity. Alternatively the closing volume may also be established by enlarging the volume of the cavity, for example by introducing a fluid into the cavity under pressure.

In order to obtain a specific or predefined geometry of the tubular element when applying the vacuum, it may be appropriate to predefine folding points. This can be done by way of a central web, which is either formed directly with the tubular element (for example extruded), or alternatively the central web may be installed subsequently in the tubular element and may be composed of a relatively solid material, such as a thermoplastic or thermosetting plastic material, a metal material etc.

The tubular element may be of very slender design when the vacuum is applied.

The term vacuum is here taken to mean that a negative pressure is applied to the volume of the cavity, such that the latter is reduced in comparison to the relaxed state.

According to a further preferred embodiment the radiator grill arrangement comprises a first plate, which forms the first grill element, and a second plate, which forms the second grill element, wherein the plates are each arranged transversely to the direction of flow of the air flow and in series in the direction of flow, wherein the first plate comprises at least one first aperture and the second plate comprises at least one second aperture, wherein the air flow can be ducted through the apertures, and having a device for adjusting the flow cross section provided for the air flow.

This embodiment forms an invention in its own right, irrespective of whether or not the first grill element comprises an elastically deformable closing element.

The first aperture and the second aperture may be staggered in the direction of flow, so that the possibility of a radiator located behind the radiator grill arrangement being directly exposed to a direct air flow and possible particle covering can be excluded.

If the first grill element comprises an elastically deformable closing element, this may be fixed to the first grill element in such a way that it is capable of closing the second aperture of the second plate in the direction of flow.

It goes without saying here that the plates may be supported on a common frame, which forms an interface with the vehicle body. The plates furthermore preferably have a plurality of apertures. The plates preferably extend over the entire area of the radiator grill arrangement, but at least over a third of the total area of the radiator grill arrangement.

Here the first plate may be the front plate exposed to the headwind or also the rear plate facing the radiator.

It is especially preferred here if the adjustment device is designed to move at least one of the plates relative to the other, in such a way that of the first and second apertures at least one is opened in a first relative position and is at least partially closed in a second relative position.

It is especially preferred here if the adjustment device is designed to move the plate in a direction parallel to the direction of flow.

It is furthermore possible for the adjustment device to be designed to move the plate in a transverse direction to the direction of flow.

In this embodiment the plates may be displaced in relation to one another but may also be pivoted in relation to one another.

According to a further preferred embodiment the closing element comprises a layer composed of an elastically deformable material, which comprises at least one elastically expansible slit, the edges of which form the closing edge and the counter-edge, which when situated adjacently to one another close the air channel.

This embodiment is particularly inexpensive to produce, for example from a plate or film of an elastically deformable material, into which one or a plurality of such slits is introduced.

It is preferred here if the layer of the elastically deformable material is fixed to a first plate, the plate having an aperture in the area of the slit.

The opening of the slits may ensue, for example, due to the pressure of the headwind.

It is especially preferred, however, if the second grill element comprises expansion means, which are designed to expand the slit in order to open the air channel.

Here the expansion means may act, for example, in that the grill elements are moved relative to one another.

It is especially preferred here if the expansion means comprise a conically tapering expansion element, which is designed to penetrate into the slit in order to expand the latter.

Here the expansion element in a closed position may be disposed so that a tip thereof is located immediately behind the slit, in order to support the layer of elastically deformable material in this area, particularly in opposition to an increased pressure of the headwind. In the open position the closing element can then penetrate into the slit through the aperture in the first grill element.

In order to establish the air channel here, at least one aperture, through which the air flow can flow, may be provided in the second grill element.

Alternatively the expansion means comprise at least one hook element, which grips around one of the slit edges and is designed to draw the slit open.

Suitable hook arrangements, which extend in a direction parallel to the extent of the elastically deformable layer and are displaceable in this direction, in order to draw the slit (or slits) open, may be provided for this purpose.

The present invention in general affords at least one of the following advantages:

The use of flexible or elastic elements is more effective in achieving a noise reduction or damping. Secondly it is possible to establish a mode of operation that is less susceptible to malfunction.

The use of elastically deformable materials serves to avoid a blockage due to snow covering and other foreign bodies. It is furthermore possible to prevent such a blockage in that a purely translational movement between few elements allows the air channel to be opened or closed. The elastic deformability of the closing element is capable of ensuring that iced up or dried fouling falls off as soon as the closing element is deformed.

With the use of tubular elements, any fouling or icing can be actively removed in that the tubular elements are subjected to pulses of air or other fluid, in order to detach the fouling. Alternatively or in addition, a heated fluid may also be used in order to detach layers of ice, for example, from the tubular elements.

A variation in the volume of such a tubular element can be produced by a pump. Alternatively the required quantity of air may be drawn from a reservoir, which is fed by a pump or an existing component of the vehicle (for example a compressor such as a turbocharger).

For regulating the adjustment of the radiator grill arrangement it is possible to use parameters such as the coolant temperature, the coolant pressure or the road speed of the vehicle. Combinations of these control variables may also be used for adjustment of the radiator grill arrangement.

It goes without saying that the features specified above and those yet to be explained below may be used not only in the particular combination specified but also in other combinations, or in isolation, without departing from the scope of the present invention.

BRIEF DESCRIPTION OF THE DRAWINGS

Exemplary embodiments of the invention are represented in the drawing and will be explained in more detail in the following description. In the drawing.

DETAILED DESCRIPTION OF THE INVENTION

Figure 1:
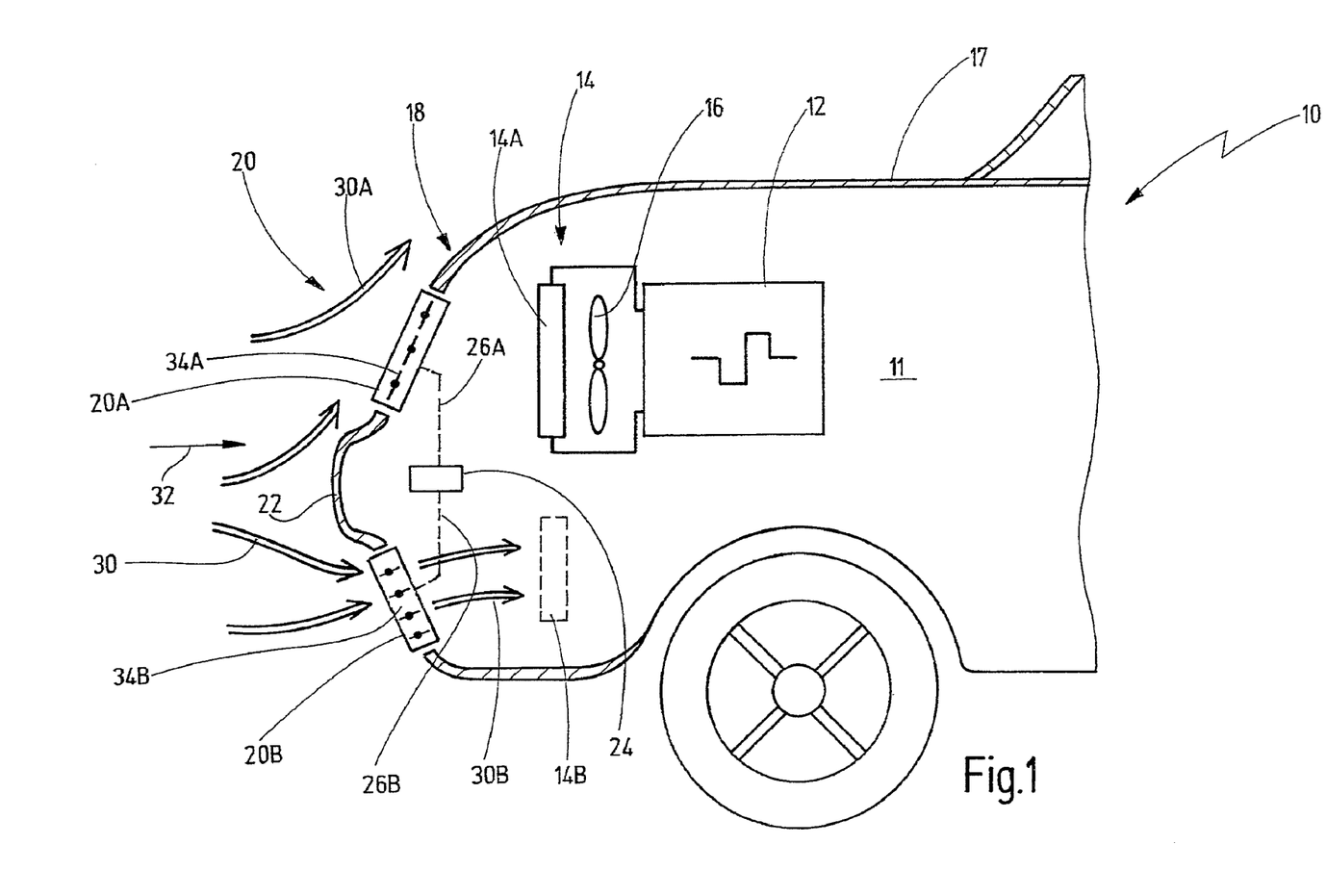
FIG. 1 shows a schematic view in longitudinal section through the front part of a motor vehicle having a radiator grill arrangement.

FIG. 1 shows a schematic view in longitudinal section of a motor vehicle such as a passenger car, denoted generally by 10.

The motor vehicle 10 comprises an engine compartment 11, in which an internal combustion engine 11 (or another prime mover) is arranged. A radiator arrangement 14 is assigned to the internal combustion engine 12. The radiator arrangement 14 comprises a first radiator 14A, which is designed for the direct engine cooling of the internal combustion engine 12 and possibly a second radiator 14B (shown by dashed lines), which may be provided, for example, for the charge air cooling for a turbocharger.

A cooling fan 16A, which is designed to establish an air flow through the radiator 14A, is assigned to the first radiator 14A.

The motor vehicle 10 comprises a vehicle body 17 having a vehicle front 18, which is fitted with a radiator grill arrangement 20. The radiator grill arrangement 20 comprises a first radiator grill 20A, which is assigned to the first radiator 14A, and a second radiator grill 20B, which is assigned to the second radiator 14B. The first radiator grill 20A is arranged above a bumper 22. The second radiator grill 20B is arranged below the bumper 22.

The first and second radiator grills 20A, 20B are each of adjustable design. Here a control unit 24, which may be embodied as an autonomous control unit or which may be part of a higher control unit, is assigned to the radiator grill arrangement 20. The control unit 24 is designed to adjust the radiator grill arrangement 20 by means of an actuator arrangement 26. More precisely, the actuator arrangement 26 comprises a first actuator 26A for adjusting the first radiator grill 20A and a second actuator 26B for adjusting the radiator grill 20B. The actuators 26 may be activated independently of one another, or they may also be coupled together. The activation of the actuators 26 by means of the control unit 24 may ensue on the basis of the various boundary conditions, for example on the basis of the coolant temperature in one of the radiators 14A, 14B, on the basis of the coolant pressure or also on the basis of the road speed of the vehicle 10. A combination of these variables may also be used.

An air flow, which flows on to the vehicle front 18 from the front, is shown at 30. This air flow may be either a headwind, or also an air flow which is established through the intake of air by the cooling fan 16. The direction of flow of the air flow 30 is shown at 32.

The first radiator grill 20A and the second radiator grill 20B are adjustable in such a way that respective air channels 34A, 34B may be either opened or closed. It is shown, in respect of the radiator grill 20A, that the associated air channel 34A (or the plurality of air channels 34A established therein) is closed, in such a way that the air flow 30 cannot get into the engine compartment 11, but is carried past the vehicle body 17.

The air channel 34B (or the air channels 34B), on the other hand, in the second radiator grill 20B is opened, so that an air flow 30B into the engine compartment 11 is established, which flows to the associated radiator 14B and ensures the necessary cooling capacity.

Various embodiments of radiator grill arrangements, which can be used as radiator grill 20A and/or radiator grill 20B, will be described below. It will further be appreciated that the representation and integration of the radiator grill arrangement 20 into the front part of the motor vehicle is only an example. Furthermore, an internal combustion engine need not necessarily be accommodated in the front part of the vehicle 10, but may be embodied as a mid-engine or rear engine.

The radiator grill arrangements described below generally comprise a plurality of apertures for establishing parallel air flows through the radiator grill arrangement 20. Generally, in order to simplify the description, only one of these apertures is described in each case.

Figures 2, 3:
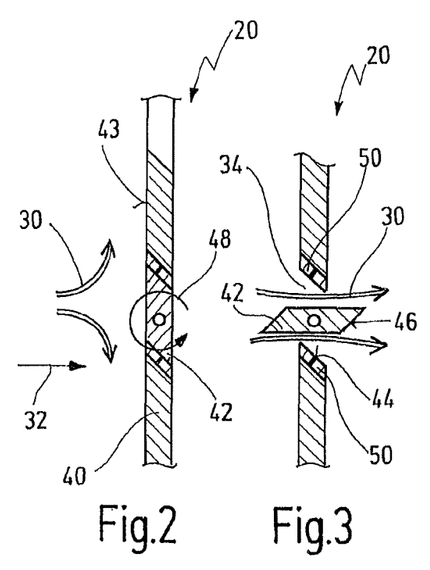
FIG. 2 shows a schematic sectional view through a radiator grill arrangement according to one embodiment of the invention with air channel closed.
FIG. 3 shows the radiator grill arrangement in FIG. 2 with air channel opened.

FIGS. 2 and 3 show a first embodiment of a radiator grill arrangement 20, which comprises a first grill element 40 in the form of a plate or the like, which extends in a transverse direction to the direction of flow 32. The radiator grill arrangement 20 further comprises a second grill element 42 in the form a rotatable vane, which is capable of pivoting about an axis of rotation, which likewise runs transversely to the direction of flow 32. In a first position (closed position) the vane 42 is pivoted so that it closes an aperture provided in the first grill element 40 and consequently closes an air channel 34 passing through radiator grill arrangement 20. Here the first grill element 40 and the second grill element 42 preferably form a continuous, substantially flush surface 43, so that the air flow 30 can be led past outside the radiator grill arrangement 20 without any major turbulence.

In FIG. 3 the second grill element 42 is shown in an open position, in which the second grill element 42 is rotated in relation to the first grill element 40, so that an air channel 34 is established passing through the radiator grill arrangement 20.

To establish the closed position, the first grill element 40 comprises a closing edge 44, and the second grill element 42 comprises a counteredge 46, which bear against one another in the closed position. In FIG. 2 the relative movement between the first grill element 40 and the second grill element 42 is denoted by 48.

In the embodiment represented, the first grill element 40 comprises a closing element 50, which may be formed from an elastically deformable material, for example, such as an elastically deformable thermoplastic material, a foam material or the like. The closing element 50 here forms the closing edge 44 of the first grill element 40.

The elastic deformability of the closing edge 44 thereby established firstly serves to afford an improved sealing of the air channel 34 in the closed position. A greater degree of sound insulation can thereby be achieved. Secondly a mode of operation that is less susceptible to malfunction can also thereby be established. In particular blockages due to fouling (snow covering, insects etc.) can be avoided, since such fouling can be more easily detached due to the elastic deformability of the closing element 50 and can thus fall off the closing edge 44. The sealing between the first grill element 40 and the second grill element 42 can moreover be ensured even if smaller foreign bodies adhere between the closing edge 44 and the counteredge 46, since these foreign bodies are elastically pressed into the surface of the closing element 50 when the closed position is established. When the open position is re-established, these foreign bodies can be detached from the closing edge 44 with relative ease, when the closing element 50 is elastically deformed back into a basic shape.

Here the closing edge 44 may be formed in its entirety or also partially by an elastically deformable closing element 50. FIGS. 2 and 3 show that two closing edges 44 and corresponding counteredges 46 are established between the first grill element 40 and the second grill element 42. It is furthermore shown that in this case the two closing edges 44 are each formed by an elastically deformable closing element 50.

Alternatively it is also possible for just one of the closing edges 44 to be formed by an elastically deformable closing element 50.

Further embodiments of radiator grill arrangements according to the invention, which in construction and mode of operation correspond generally to the radiator grill arrangement 20 in FIGS. 2 and 3, will be described below. Identical elements are therefore provided with the same reference numerals. Only the differences will be examined below.

Figure 4:
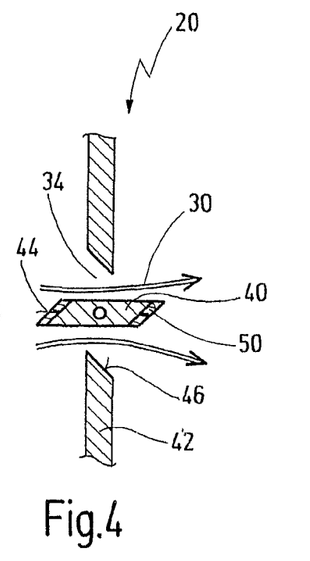
FIG. 4 shows a radiator grill arrangement according to the invention, which is modified in relation to the radiator grill arrangement in FIGS. 2 and 3, and with air channel opened.

FIG. 4 shows a modification of the radiator grill arrangement 20 in FIGS. 2 and 3. The radiator grill arrangement 20 in FIG. 4 is formed so that the vanes each carry an elastically deformable closing element 50 at their edges. The vanes in this case therefore each form a first grill element 40, whereas the transversely running plate is embodied as a second grill element 42. The counteredges 46 are correspondingly formed on the plate 42.

It will be appreciated that a closing element 50 can furthermore be provided both in order to form the closing edge 44 and to form the counteredge 46. For example, the radiator grill arrangements in FIGS. 2, 3 and 4 may also be combined with one another.

Figure 5:
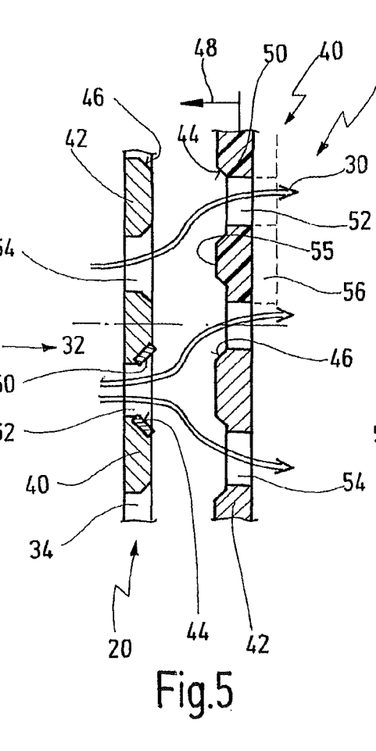
FIG. 5 shows a schematic sectional view through a further embodiment of a radiator grill arrangement according to a further embodiment.

FIG. 5 shows two variants of radiator grill arrangements 20 according to the invention. A radiator grill arrangement 20, which comprises a first grill element 40, which is embodied as a transversely running plate and is formed, at least in the area of the closing edge 44, from an elastically deformable material, is shown in the upper part of FIG. 5. However, the plate forming the first grill element 40 may also be formed in its entirety from an elastically deformable material. The radiator grill arrangement 20 in the upper part of FIG. 5 furthermore comprises a second plate 42, which forms a second grill element 42. The second plate 42 is arranged offset approximately parallel to the first plate 40 and likewise extends transversely to the direction of flow 32. One or more first apertures 52 are provided in the first plate 40. One or more second apertures 54 are provided in the second plate 42. In FIG. 5 the radiator grill arrangement 20 is shown in an opened state, in which the plates 40, 42 are separated at an interval from one another and an air flow 30 is established passing through the first aperture 52 and the second aperture 54. To establish the closed position, the first plate 40 is displaced by a translational movement in relation to the second plate 42, as is shown at 48. The first aperture 52 and the second aperture 54 are staggered in a transverse direction to the direction of flow 42, so that the second aperture 54 is closed when the plates 40, 42 are moved towards one another. Here an elevation 55, which penetrates into the second aperture 54 in order to close the latter, may be provided on the first plate 40, on the side facing the second plate 42.

The elevation 55 may be of conically tapering design at the edges, resulting in oblique closing edges 44, which in the closed position bear against correspondingly obliquely formed counteredges 46. Although this is not shown in FIG. 5, the elevations 55 here may furthermore be formed so that a continuous surface 43 is produced, as represented in FIG. 2.

If the first grill element 40 is embodied as a continuous elastic plate, this may be connected to a carrier element 56, which is likewise of plate-like design and is indicated schematically in FIG. 5.

The lower part of FIG. 5 shows a modified embodiment of a radiator grill arrangement, the basic construction of which corresponds to that in the upper part of FIG. 5.

Here, however, a front plate is embodied as first grill element 40, elastically deformable closing elements 50 being inserted at each of its edges 44, which enclose a first aperture 52. Here the rear plate in the direction of flow 32 is embodied as second grill element 42 and may take the form of a rigid plate.

Figure 6:
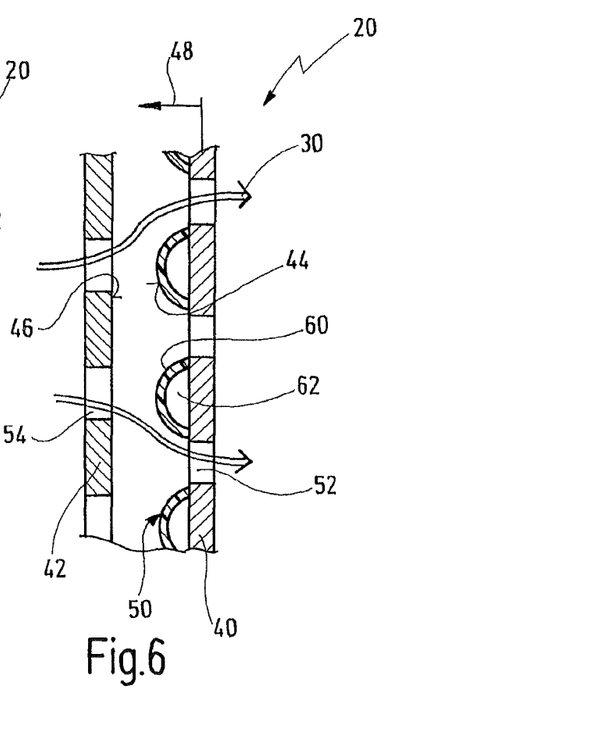
FIG. 6 shows a schematic sectional view through a radiator grill arrangement according to a further embodiment of the invention.

FIG. 6 shows a further embodiment of a radiator grill arrangement according to the invention. The radiator grill arrangement 20 in FIG. 6 comprises a first grill element 40 having a transversely running plate. On the side facing the second plate (second grill element 42) the first grill element 40 comprises a tubular element 60 composed of an elastically deformable material, which in this case forms a closing element 50. The tubular element 60 comprises a cavity 62, which is filled with a fluid (a gas or a liquid). The tubular element may be open or closed at its ends (not shown in FIG. 6).

A relative movement between the first grill element 40 and the second grill element 42 again ensues as a translational movement, as shown at 48. FIG. 6 shows the radiator grill arrangement 20 in an opened state, in which an air flow 30 is established, passing through the first aperture 52 and the second aperture 54. To establish the closing movement through the relative movement 48, a projecting portion of the tubular element 60 comes to bear against a rear edge of the second aperture 54. Here in the closed position a front portion of the tubular element 60 forms a closing edge 44, which is designed for an elastically pliable bearing contact against the counteredge 46 of the second grill element 42.

Figure 7:
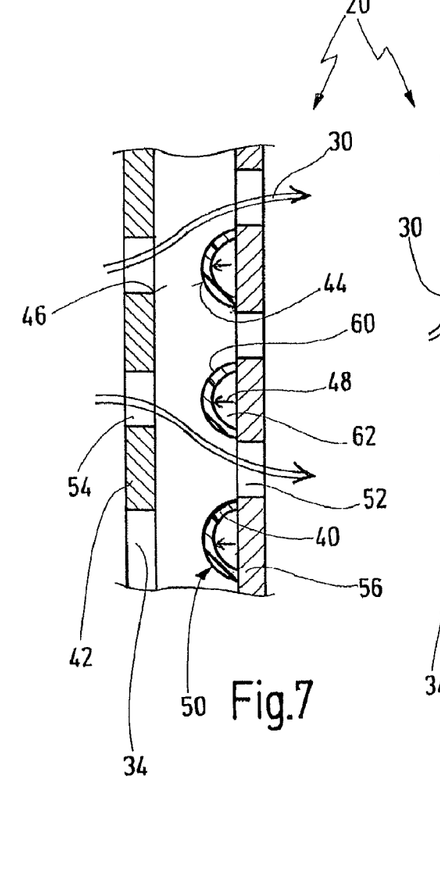
FIG. 7 shows a sectional view through a radiator grill arrangement according to a further embodiment of the invention with air channel opened.
Figure 8:
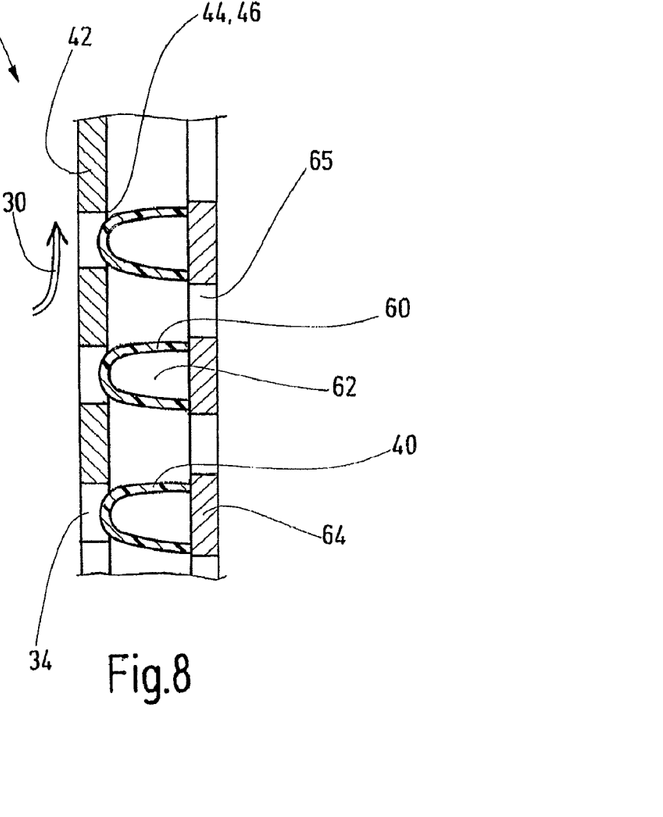
FIG. 8 shows the radiator grill arrangement in FIG. 7 with air channel closed.

FIGS. 7 and 8 show a further alternative embodiment of a radiator grill arrangement 20. Its construction corresponds generally to that of the radiator grill arrangement in FIG. 6.

In this case the tubular element 60 is formed so that the volume of the cavity 62 can be varied parallel to the direction of flow 32. The tubular element 60 here forms a first grill element 40, which is fixed to a plate, which is fixed to a housing and which is designed as carrier element 56 for the first grill element 40.

In FIG. 7 the radiator grill arrangement is shown in an opened position, wherein an air flow 30 is established through the first aperture 52 and the second aperture 54.

In FIG. 8 the radiator grill arrangement 20 is shown in a closed position. Here the volume of the cavity 62 is enlarged in such a way that the tubular element 60 has expanded towards the second grill element 42. The corresponding relative movement 48 is indicated in FIG. 7. In the closed position the tubular element 60 again bears against a counteredge 46 of the second grill element 42, so that its second aperture 54 is closed.

Figure 9:
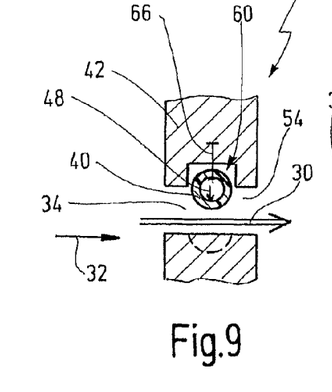
FIG. 9 shows a sectional view through a further embodiment of a radiator grill arrangement according to the invention with air channel opened.
Figure 10:
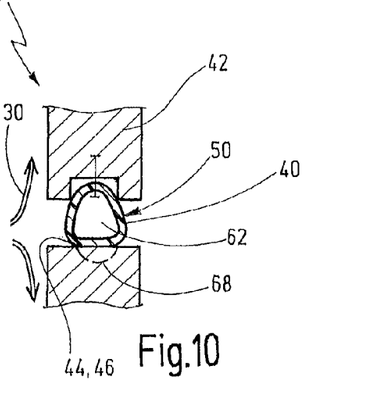
FIG. 10 shows the radiator grill arrangement in FIG. 9 with air channel closed.

FIGS. 9 and 10 show a further embodiment of a radiator grill arrangement. Like the radiator grill arrangement 20 in FIGS. 7 and 8, the radiator grill arrangement 20 in FIGS. 9 and 10 comprises a tubular element 60, the cavity volume of which is variable.

In the radiator grill arrangement 20 in FIGS. 9 and 10 the tubular element 60 again forms a first grill element 40, which is fixed to a transversely running plate, which forms a second grill element 42. The second grill element 42 here comprises a second aperture 54, which can be closed by means of the tubular element 60. The tubular element 60 is fixed to the second grill element 42 by means of a fastener 66, in such a way that a variation of the volume of the cavity 62 leads to an expansion of the tubular element 60 substantially in the plane of the second grill element 42, that is to say transversely to the direction of flow 32. Here in FIG. 9 a volume of the cavity 62 is established which allows an air flow 30 passing through the second aperture 54 (opened state). FIG. 10 shows the closed state, in which the volume of the cavity 62 has been expanded to the extent that the tubular element bears against an opposing side of the second aperture 54. In this case a depression 68 may be formed in the opposing side of the second aperture 54, in order to ensure an improved sealing.

Figure 11:
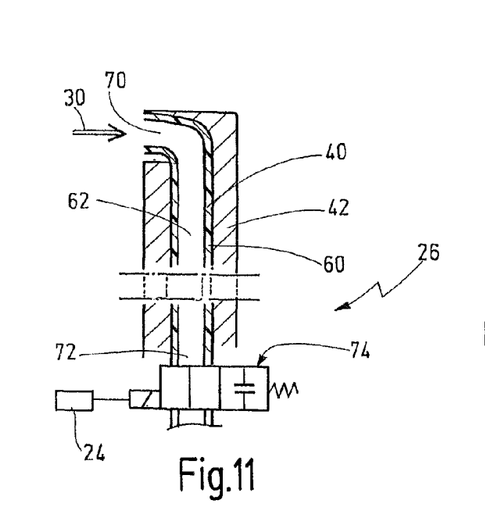
FIG. 11 shows a cross sectional view through the radiator grill arrangement in FIG. 9 with a device for varying the volume of a tubular element.
Figure 12:
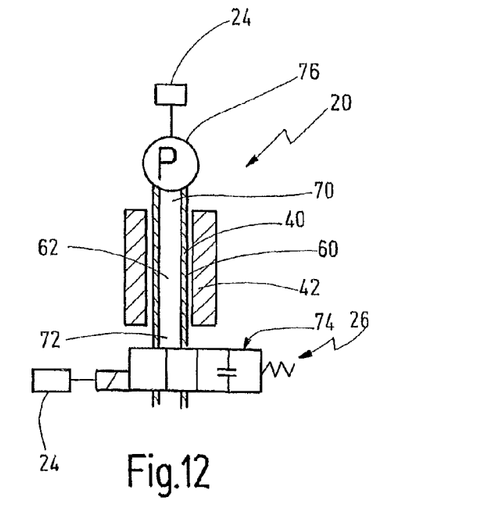
FIG. 12 shows a view of a radiator grill arrangement corresponding to FIG. 11 with an alternative device for varying the volume of a tubular element.

Means 26 for adjusting the cavity volume of a tubular element 60, as used in FIGS. 7 to 10, are shown in schematic form in FIGS. 11 and 12.

Here the tubular element 60 generally comprises a first connection 70 and a second connection 72. In the embodiment in FIG. 11 the first connection 70 is directly exposed to the air flow 30, the delivery pressure of which rises with increasing road speed, for example. The second connection 72 is either permanently closed or, as shown, is connected to a valve 74. In the simplest case the valve 74 may be a directional control valve such as a 2/2-way directional control valve. Here the directional control valve 74 may be spring-biased, as represented, and can be actuated electromagnetically, for example by means of the control unit 24.

In the position of the valve 74 shown, inflowing air on the side of the second connection 72 is diverted outwards, so that the tubular element 60 experiences no substantial change in volume compared to its basic state. When the valve 74 is actuated, in order to close the second connection 72, the volume of the cavity 62 varies due to the inflowing air flow 30, in order to establish the closed state in FIG. 8 or 10, for example.

FIG. 12 shows a variant for the adjustment of the cavity volume, in which the first connection 70 is connected to a pump 76, which just like the valve 74, for example, may be coupled to a control unit 24 and activated by the latter.

The pump 76 can be designed to enlarge the cavity volume by pumping fluid into the tubular element 60 under pressure. Alternatively or in addition the pump 76 may also be designed to apply a vacuum to the cavity volume, in such a way that the cavity volume is reduced, in particular minimized.

The option to enlarge the cavity volume or to reduce the cavity volume (in each case relative to the non-elastically deformed state of the tubular element) can also be established by any other means.

FIGS. 13 to 18 show a further embodiment of a radiator grill arrangement 20.

Figure 13:
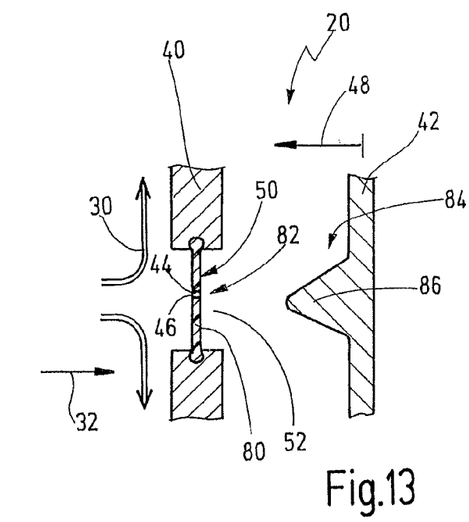
FIG. 13 shows a view in longitudinal section through a further embodiment of a radiator grill arrangement according to the invention with air channel closed.
Figure 15:
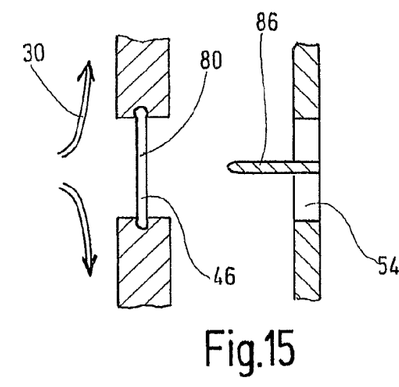
FIG. 15 shows a cross sectional view through the radiator grill arrangement in FIG. 13.
Figure 17:
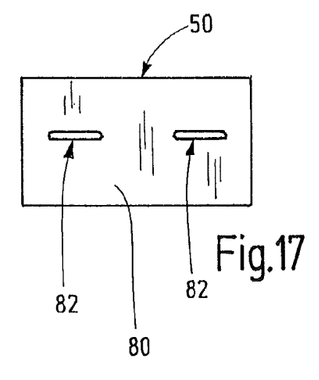
FIG. 17 shows a schematic front view of a radiator grill arrangement, which corresponds to the radiator grill arrangement in FIGS. 13 to 16, and with air channel closed.

The radiator grill arrangement 20 comprises a first grill element 40, which comprises a transversely running plate and a layer 80 of an elastically deformable material affixed thereto. The plate of the first grill element 40 is provided with a first aperture 52, which is closed by the elastic layer 80. The elastic layer 80 may take the form, for example, of an elastically deformable plate or film. A slit 82, the opposing edges of which form the closing edge 44 and the counteredge 46, is introduced into the layer 80. In the normal, that is to say non-elastically deformed state the slit 82 is closed, as is represented in FIGS. 13, 15 and 17. Consequently the first aperture 52 is also closed, so that an air flow 30 is diverted outside the radiator grill arrangement 20.

Figure 14:
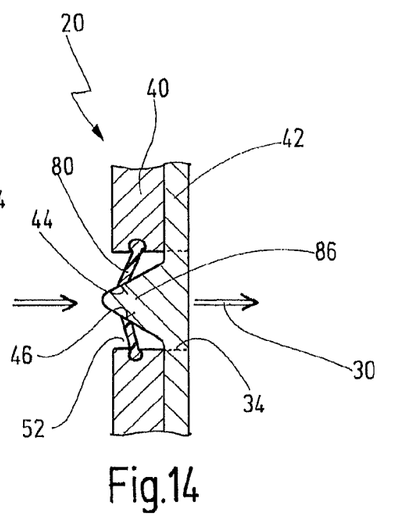
FIG. 14 shows the radiator grill arrangement in FIG. 13 with air channel opened.
Figure 16:
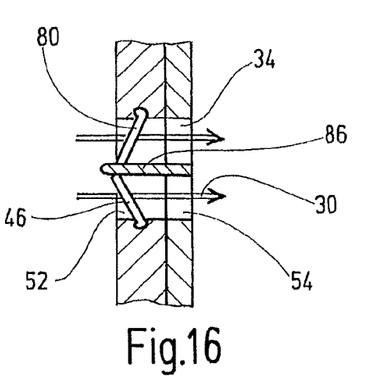
FIG. 16 shows a cross sectional view through the radiator grill arrangement in FIG. 14.
Figure 18:
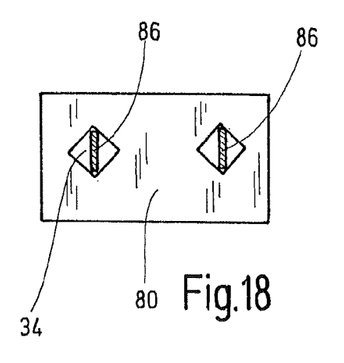
FIG. 18 shows the radiator grill arrangement in FIG. 17 with air channel opened.

The radiator grill arrangement further comprises a second grill element 42, which is moveable relative to the first grill element 40, in a translational direction parallel to the direction of flow 32, as is shown at 48. Expansion means 84 for expanding the slit 82 are provided on the second grill element 42, which is likewise embodied as a transversely running plate having a second aperture 54 (see FIGS. 15 and 16). The expansion means 84 comprise a conical expansion element 86, which is formed on the second grill element 42 on the side facing the first grill element 40. Here the expansion element 86 is located behind the slit 82. If the second grill element 42 is moved towards the first grill element 40, the expansion element 86 penetrates into the slit 82 and expands this, as is shown in FIGS. 14, 16, 18. Consequently, as is shown in particular in FIG. 16, the air channel 34 is established, which is formed by the first aperture 52 and the second aperture 54 and through which an air flow 30 can flow.

Here the second aperture 54 is aligned with the first aperture 52 in the direction of flow and is formed around the expansion element 86.

In the open position the expansion element 86 is also located so that it lies with its leading tip immediately behind the slit 82. The elastic layer 80 can thereby be supported in the area of the slit 82 in opposition to the incident headwind, so that an accidental opening of the slit can be at least largely avoided.

Figure 19:
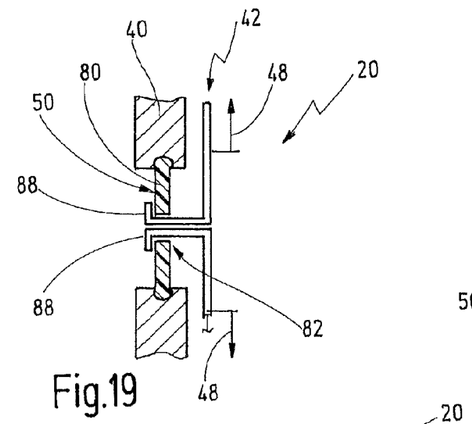
FIG. 19 shows a view in longitudinal section through a further embodiment of a radiator grill arrangement according to the invention.

FIG. 19 shows a further radiator grill arrangement 20, the basic construction of which corresponds to that of the radiator grill arrangement 20 in FIGS. 13 to 18. In this case, instead of the expansion element 86, expansion means 84 are provided, which comprise at least one, and in the embodiment shown two hook elements 88. The hook elements 88 form part of a second grill element 42 and grip behind the slit 88. The hook elements 88 are displaceably supported in a direction parallel to the extent of the elastic layer 80. In FIG. 19 the radiator grill arrangement 20 is shown in a closed state, in which the slit 82 is closed. If the hook elements 88 are moved in opposition to one another, as is shown at 48 in FIG. 19, the hook elements 88 expand the slit 82 by drawing the latter open.

Figure 20:
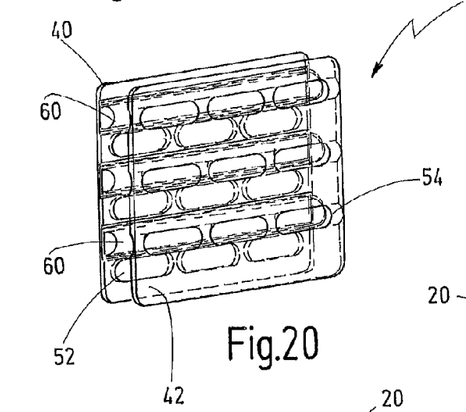
FIG. 20 shows a perspective representation of a further embodiment of a radiator grill arrangement according to the invention, which corresponds to the radiator grill arrangements in FIGS. 6 to 8.
Figure 21:
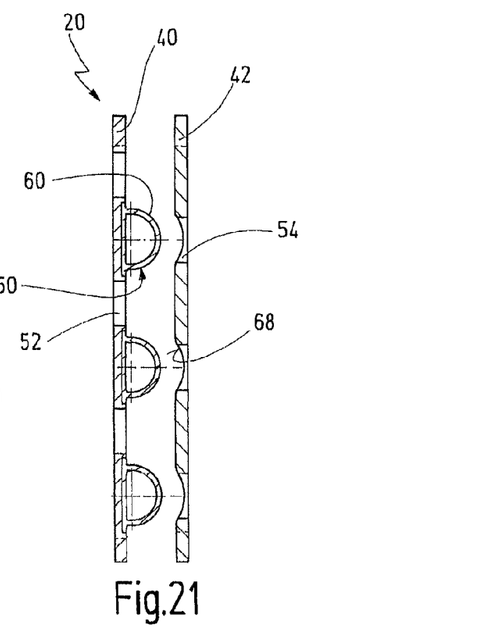
FIG. 21 shows a view in longitudinal section through the radiator grill arrangement in FIG. 20.

FIGS. 20 and 21 show a radiator grill arrangement 20, which in construction and mode of operation corresponds generally to the radiator grill arrangements in FIGS. 6 to 8. As shown, the first plate 40 and the second plate 42 comprise a plurality of apertures 52 and 54 arranged staggered in the direction of flow, a series of apertures 54 being arranged side by side and parallel to the extent of the tubular element 60. Accordingly, one tubular element in each case is capable of closing a plurality of second apertures 54, if the plates 40, 42 are moved against one another (or the tubular element 60 varies in volume).

FIG. 21 furthermore shows that in the area of the second apertures 54 the second plate 42 in cross section forms a groove-shaped depression 68, so that the tubular element in the closed state can penetrate into this depression. This serves to increase the leak-tightness in the closed state. The tubular element 60 can also be protected from sharp-edged contact with the second grill element 42.

Figure 22:
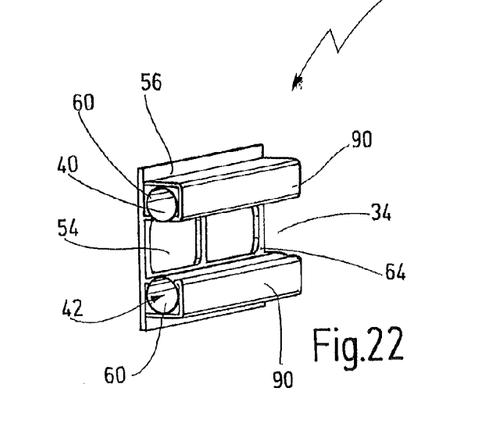
FIG. 22 shows a perspective representation of a further embodiment of a radiator grill arrangement according to the invention, which corresponds to the radiator grill arrangement in FIGS. 9 to 12, and with air channel opened.
Figure 23:
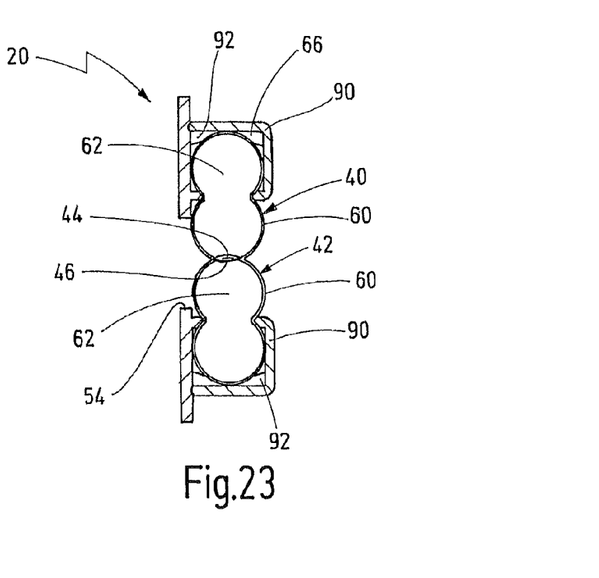
FIG. 23 shows a view in longitudinal section of the radiator grill arrangement in FIG. 22 with air channel closed.

FIGS. 22 and 23 show a further embodiment of a radiator grill arrangement 20, which in its construction and in its mode of operation corresponds to the radiator grill arrangement 20 in FIGS. 9 and 10. Here, however, the radiator grill arrangement 20 comprises a carrier plate, on which a first tubular element 60, which forms the first grill element 40, and a second tubular element 60, which forms the second grill element 42, are provided. Here the tubular elements 60 are arranged on opposite sides of an aperture 54 in the carrier element 56 and are each designed to be varied in their volume. In FIG. 22 the radiator grill arrangement is shown in an opened state. FIG. 23 shows the closed state, in which the tubular elements 60 each have an enlarged volume, so that they extend transversely over the aperture 54 and touch one another (so that the one tubular element 60 forms a closing edge 44 and the other tubular element 60 forms a counteredge 46, as is represented in FIG. 23.

Here the tubular elements are each supported on the carrier element 56 by retaining profiles 90, which at the minimum volume of the tubular element 60 enclose this almost completely, as is shown in FIG. 22. Here the tubular elements 60 are fixed in the retaining profiles 90 by fasteners 66, which may take the form of an adhesive 92, for example, as is represented in FIG. 23.

Figures 24, 25, 26:
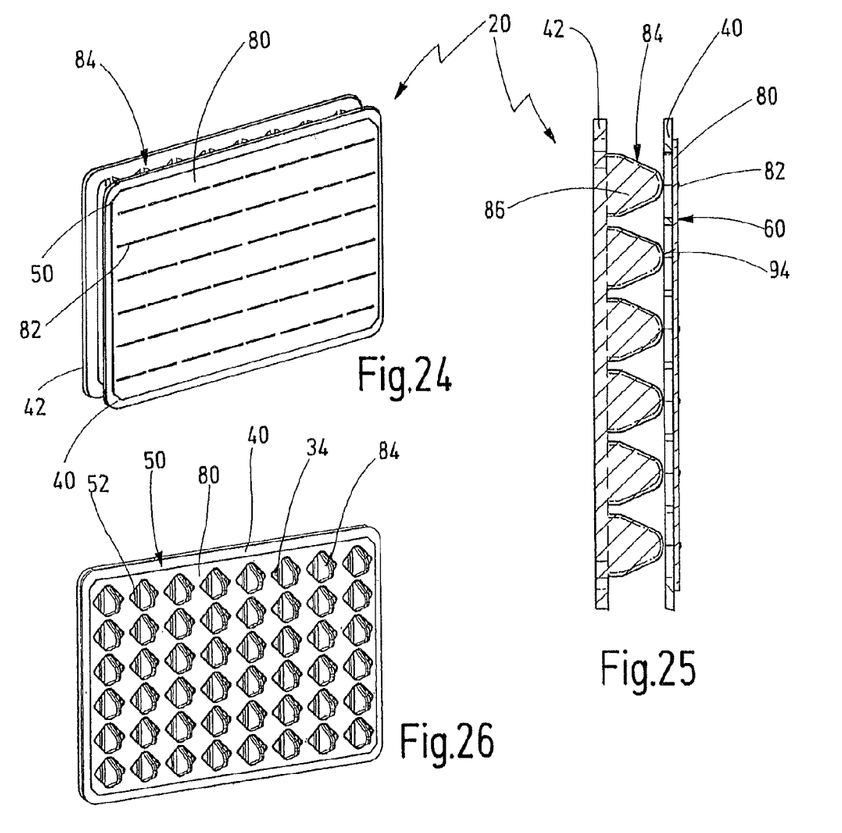
FIG. 24 shows a perspective representation of a further embodiment of a radiator grill arrangement according to the invention, which corresponds to the radiator grill arrangement in FIGS. 13 to 18.
FIG. 25 shows a view in longitudinal section through the radiator grill arrangement in FIG. 24 with air channel closed.
FIG. 26 shows a perspective view of the radiator grill arrangement in FIG. 24 with air channel opened.

FIGS. 24 to 26 show a further embodiment of a radiator grill arrangement 20, which in construction and mode of operation corresponds generally to the radiator grill arrangement 20 in FIGS. 13 to 18.

Here it can firstly be seen that the elastic layer 80 comprises a plurality of slits 82 and that the second grill element 42 correspondingly comprises a plurality of conical expansion elements 86, which are each assigned to a slit 82. It can further be seen from FIG. 25 that the conical expansion elements 86 are flattened at their tip 94, in order to afford better rear support for the slit 82 in the opened state, FIGS. 27 and 28 show a further embodiment of a radiator grill arrangement 20, which in construction and mode of operation corresponds generally to the radiator grill arrangement 20 in FIG. 19.

Figures 27, 28:
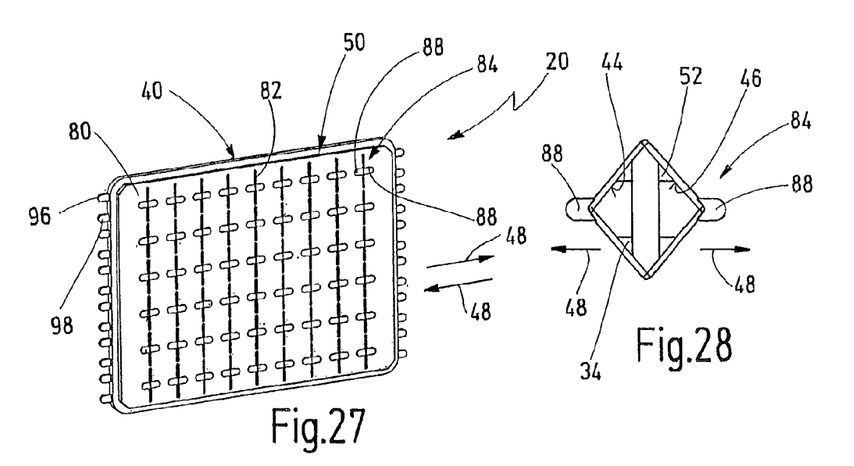
FIG. 27 shows a perspective view of a further embodiment of a radiator grill arrangement according to the invention, which corresponds to the radiator grill arrangement in FIG. 19, and with air channel closed.
FIG. 28 shows a detailed view of the radiator grill arrangement in FIG. 27 with air channel opened.

A plurality of first strips 96 and of second strips 98 are displaceably supported on the plate 40, to which the elastic layer 80 having a plurality of slits 82 is affixed, the strips being displaceable in opposite directions 48, as is shown in FIGS. 27 and 28. Here first hook elements 88, which grip behind each of the slits 82 from one side, are assigned to each of the first strips 88 respectively. Second hook elements 88, which grip behind the slits 82 from the other side, are assigned to each of the second strips 98. FIG. 28 here shows an opened state, in which the hook elements 88 have expanded the slit, so that an air channel 34 is established.

Figure 29:
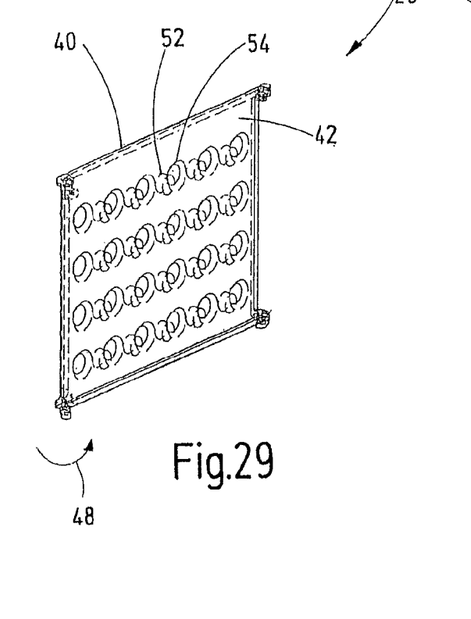
FIG. 29 shows a perspective representation of a further embodiment of a radiator grill arrangement according to the invention.
Figure 30:
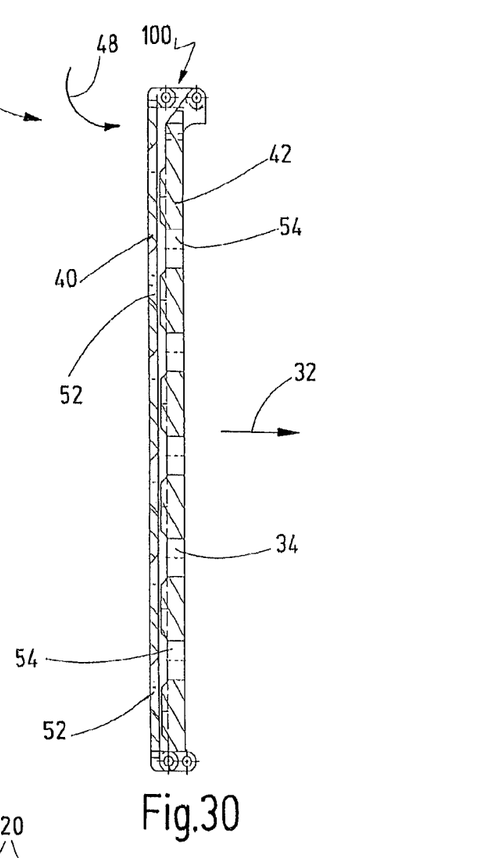
FIG. 30 shows a view in longitudinal section through the radiator grill arrangement in FIG. 29.

FIGS. 29 and 30 show a further radiator grill arrangement 20, which in construction and mode of operation corresponds generally to the radiator grill arrangement 20 in FIG. 5. Here the first plate 40 and the second plate 42 are coupled together by a swivel mechanism 100, so that the relative movement 48 is established through superimposition of a longitudinal movement parallel to the direction of flow 32 and a movement transversely thereto.

Figure 31:
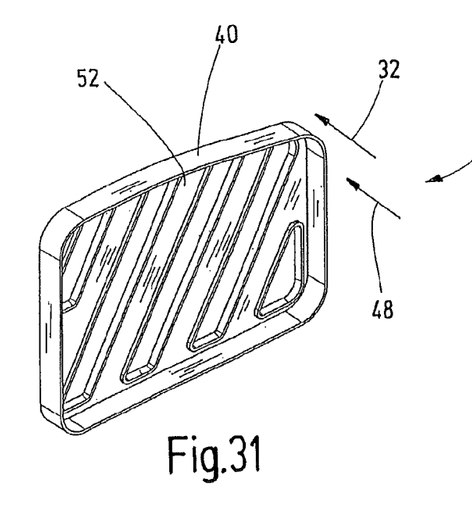
FIG. 31 shows a first grill element of a further embodiment of the radiator grill arrangement according to the invention.
Figure 32:
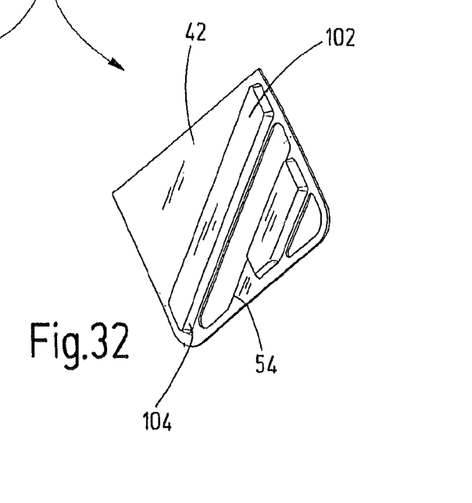
FIG. 32 shows a second grill element of the radiator grill arrangement in FIG. 31.

FIGS. 31 and 32 show a further radiator grill arrangement 20, which comprises a first plate 40 and a second plate 42. First apertures 52, which comprise conically widening seats, for example, on the side facing the second plate 42, are provided on the first plate 40. Between the second apertures 54 the second plate 42 comprises projections 102, which have beveled faces 104 at the edges, which fit into the conical seats of the first apertures 52.

The relative movement between the two plates 40, 42 may occur parallel to the direction of flow 32, as is shown in FIG. 31.

In the embodiment of the radiator grill arrangement having a first plate 40 and a second plate 42, as shown in FIG. 5 and in FIGS. 29 to 32, it is not absolutely essential that the first plate 40 or the second plate 42 have an elastically deformable closing element 50. Instead the plates 40, 42 may be embodied as rigid plates. Blockages due to snow covering or insects etc. can also be avoided in this embodiment. This is due firstly to the fact that the first apertures 52 and the second apertures 54 are arranged staggered transversely to the direction of flow 32. Secondly, any blockages can be broken up and detached with comparative ease by the relative movement between the first plate 40 and the second plate 42.

Figures 33, 34:
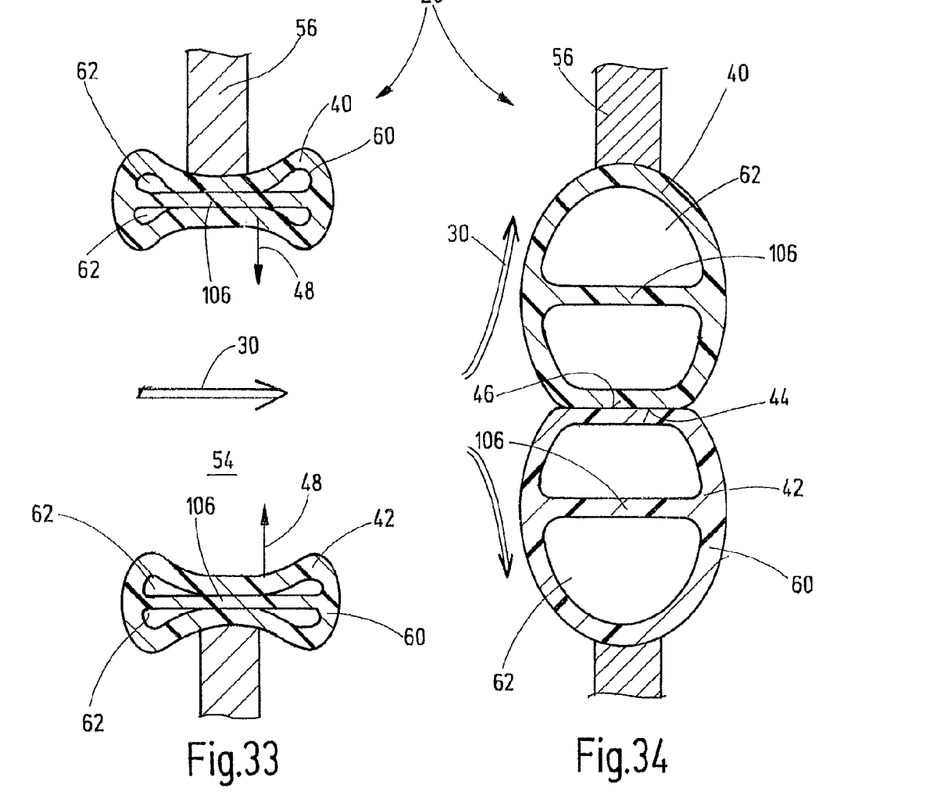
FIG. 33 shows a schematic sectional view through a further radiator grill arrangement according to the invention with air channel opened.
FIG. 34 shows the radiator grill arrangement in FIG. 33 with air channel closed.

FIGS. 33 and 34 show a further embodiment of a radiator grill arrangement according to the invention, the basic construction of which corresponds to that in FIGS. 9 to 12 and 22, 23. Only the differences will be explained below. The radiator grill arrangement 20 in FIGS. 33, 34 comprises a plate-like carrier element 56, which contains an aperture 54. A tubular element 60 is affixed to one side of the aperture 54 or, as shown, to each of two sides of the aperture 54. In the embodiment represented the one tubular element corresponds to the first grill element 40, the other tubular element 60 to the second grill element 42.

In the representation in FIG. 33 the tubular elements are in an open position, so that an air flow 30 is established, passing through the radiator grill arrangement 20. Here a vacuum is applied to the respective cavity 62 of the tubular elements 60, so that the tubular elements 60 are tightly folded up and take up only a small overall space and expose a relatively large aperture 54.

The representation in FIG. 34 shows the closed position. Here the tubular elements 60 may be in an elastically unstressed basic position, such that the closing edge 44 and the counteredge 46 bear against one another. In order to improve the sealing for closure of the aperture 54, a fluid can be introduced into the respective cavity 62 under pressure, so that the tubular elements 60 are expanded compared to their elastically relaxed state, in order to press the closing edge 44 and the counteredge 46 against one another.

The tubular elements in the embodiments described above may each have any cross section, preferably an approximately circular or semicircular cross section (in each case in the elastically relaxed state).

Figure 35:
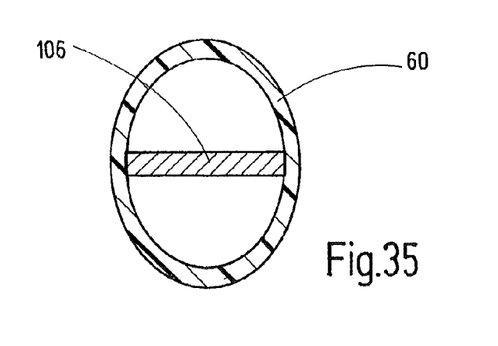
FIG. 35 shows an alternative tubular element for a radiator grill arrangement in FIGS. 33 and 34.

If a vacuum can be applied to a tubular element 60 in order to minimize the overall volume of the tubular element in one of the positions (as shown in FIG. 33), it is preferred if fold-predefining means, which serve to ensure a specific geometry when the tubular element 60 is in the collapsed state, are incorporated into the tubular element 60. Such fold-predefining means may be notches or other recesses in the tubular material. It is especially preferred, however, if a web 106 of continuous length, which ensures that the tubular element 60 in the collapsed (vacuum position) assumes a specific or predefined geometry, is introduced into the tubular element 60. Such a web 106 may be integrally formed with the tubular element 60, as shown in FIGS. 33 and 34, that is to say, for example, it may be extruded together with the tubular element 60. Alternatively it is possible to introduce such a web into the tubular element 60 subsequently, as is shown in FIG. 35. In this case the web 106 may be composed of a different material from that of the tubular element 60, for example of a relatively rigid, thermoplastic or thermosetting plastic material, a metal or the like.

To establish the vacuum it is possible, for example, to use the pump 76 shown in FIG. 12 (where necessary with reversal of the direction of rotation). Alternatively it is also possible to derive the vacuum needed for this purpose from other sources inside the vehicle.

What is claimed is:

1. An adjustable radiator grill arrangement for a motor vehicle, comprising at least one air channel, through which an air flow for the incident flow of a radiator can be guided, having a first grill element and a second grill element, which are moveable relative to one another, in order to open or to close the air channel, wherein the first grill element comprises a closing edge, which is disposed at a distance from a counteredge when the air channel is opened and adjacent to the counteredge when the air channel is closed, wherein the first grill element comprises an elastically deformable closing element, which forms the closing edge, wherein the closing element comprises a tubular element composed of an elastically deformable material, which encloses a cavity, and wherein a web, which extends in the longitudinal direction of the tubular element, is arranged in the tubular element, wherein the tubular element is designed to vary its volume at least between an opening volume for opening of the air channel and a closing volume for closing of the air channel, and wherein the tubular element is fixed to the second grill element or to a carrier element and is designed to close an aperture in the second grill element or the carrier element, when the closing volume is established.

2. The adjustable radiator grill arrangement as claimed in claim 1, wherein the tubular element forms the first grill element and the movement relative to the second grill element is established by a variation in the volume of the tubular element.

3. An adjustable radiator grill arrangement for a motor vehicle, comprising at least one air channel, through which an air flow for the incident flow of a radiator can be guided, having a first grill element and a second grill element, which are moveable relative to one another, in order to open or to close the air channel, wherein the first grill element comprises a closing edge, which is disposed at a distance from a counteredge when the air channel is opened and adjacent to the counteredge when the air channel is closed, wherein the first grill element comprises an elastically deformable closing element, which forms the closing edge, wherein the closing element comprises a tubular element composed of an elastically deformable material, which encloses a cavity, and wherein a web, which extends in the longitudinal direction of the tubular element, is arranged in the tubular element, wherein the tubular element forms the first grill element and the movement relative to the second grill element is established by a variation in the volume of the tubular element, and wherein the tubular element is fixed to a carrier element, which is located adjacently to the second grill element, and is designed to close an aperture in the second grill element, when the closing volume is established.

4. An adjustable radiator grill arrangement for a motor vehicle, comprising at least one air channel, through which an air flow for the incident flow of a radiator can be guided, having a first grill element and a second grill element, which are moveable relative to one another, in order to open or to close the air channel, wherein the first grill element comprises a closing edge, which is disposed at a distance from a counteredge when the air channel is opened and adjacent to the counteredge when the air channel is closed, wherein the first grill element comprises an elastically deformable closing element, which forms the closing edge, wherein the closing element comprises a tubular element composed of an elastically deformable material, which encloses a cavity, and wherein a web, which extends in the longitudinal direction of the tubular element, is arranged in the tubular element, wherein the closing element is fixed to one of the grill elements and is designed to close an aperture in the other grill element, when the grill elements are moved into a closing position relative to one another.

5. The adjustable radiator grill arrangement as claimed in claim 1, wherein the open volume or the closing volume is established by reducing the cavity of the tubular element through the application of a vacuum.

6. The adjustable radiator grill arrangement as claimed in claim 1, wherein the web is integrally formed with the tubular element.

7. The adjustable radiator grill arrangement as claimed in claim 1, wherein the first grill element and the second grill element are each formed by a tubular element, the tubular elements being fixed to a carrier element.

8. The adjustable radiator grill arrangement as claimed in claim 7, wherein at least one of the tubular elements is subjected to a vacuum when the air channel is opened.

9. An adjustable radiator grill arrangement for a motor vehicle, comprising at least one air channel, through which an air flow for the incident flow of a radiator can be guided, having a first grill element and a second grill element, which are moveable relative to one another, in order to open or to close the air channel, wherein the first grill element comprises a closing edge, which is disposed at a distance from a counteredge when the air channel is opened and adjacent to the counteredge when the air channel is closed, wherein the first grill element comprises an elastically deformable closing element, which forms the closing edge, wherein the closing element comprises a tubular element composed of an elastically deformable material, which encloses a cavity, and wherein a web, which extends in the longitudinal direction of the tubular element, is arranged in the tubular element, the radiator grill arrangement further having a first plate, which forms the first grill element, and a second plate, which forms the second grill element, wherein the plates are each arranged transversely to the direction of flow of the air flow and in series in the direction of flow, wherein the first plate comprises at least one first aperture and the second plate comprises at least one second aperture, wherein the air flow can be led through the apertures, and having an adjusting device for adjusting the flow cross section provided for the air flow.

10. The adjustable radiator grill arrangement as claimed in claim 9, wherein an adjustment device is designed to move at least one of the plates relative to the other, in such a way that of the first and second apertures at least one is opened in a first relative position and is at least partially closed in a second relative position.

11. The adjustable radiator grill arrangement as claimed in claim 10, wherein the adjustment device is designed to move the plate in a direction parallel to the direction of flow.

12. The adjustable radiator grill arrangement as claimed in claim 10, wherein the adjustment device is designed to move the plate in a transverse direction to the direction of flow.

13. An adjustable radiator grill arrangement for a motor vehicle, comprising at least one air channel, through which an air flow for the incident flow of a radiator can be guided, having a first grill element and a second grill element, which are moveable relative to one another, in order to open or to close the air channel, wherein the first grill element comprises a closing edge, which is disposed at a distance from a counteredge when the air channel is opened and adjacent to the counteredge when the air channel is closed, wherein the first grill element comprises an elastically deformable closing element, which forms the closing edge, and wherein the closing element comprises a layer composed of an elastically deformable material, which comprises at least one elastically expansible slit, the edges of which form the closing edge and the counteredge, which in the adjacent state close the air channel.

14. The adjustable radiator grill arrangement as claimed in claim 13, wherein the closing element comprises a tubular element composed of an elastically deformable material, which encloses a cavity, and wherein the tubular element is designed to vary its volume at least between an opening volume for opening of the air channel and a closing volume for closing of the air channel.

15. The adjustable radiator grill arrangement as claimed in claim 14, wherein a web, which extends in the longitudinal direction of the tubular element, is arranged in the tubular element.

16. The adjustable radiator grill arrangement as claimed in claim 15, wherein the web is integrally formed with the tubular element.

17. The adjustable radiator grill arrangement as claimed in claim 13, wherein the layer is fixed to a first plate, which comprises an aperture in the area of the slit.

18. The adjustable radiator grill arrangement as claimed in claim 13, wherein the second grill element comprises an expansion device, which is designed to expand the slit in order to open the air channel.

19. The adjustable radiator grill arrangement as claimed in claim 18, wherein the expansion device comprises a conically tapering expansion element, which is designed to penetrate into the slit in order to expand the latter.

20. The adjustable radiator grill arrangement as claimed in claim 18, wherein the expansion device comprises at least one hook element, which grips around one of the slit edges and is designed to draw the slit open.

* * * * *